(12) United States Patent
Bennett et al.

US008291410B2

(10) Patent No.: US 8,291,410 B2
(45) Date of Patent: Oct. 16, 2012

(54) CONTROLLING VIRTUAL MACHINES BASED ON ACTIVITY STATE

(75) Inventors: Steven M. Bennett, Hillsboro, OR (US); Andrew V. Anderson, Hillsboro, OR (US); Gilbert Neiger, Portland, OR (US); Dion Rodgers, Hillsboro, OR (US); Barry E. Huntley, Hillsboro, OR (US); Lawrence O. Smith, Beaverton, OR (US); Shashank Shekhar, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 1208 days.

(21) Appl. No.: 11/618,440

(22) Filed: Dec. 29, 2006

(65) Prior Publication Data

US 2008/0163205 A1 Jul. 3, 2008

(51) Int. Cl.
G06F 9/455 (2006.01)

(52) U.S. Cl. .......................................................... 718/1

(58) Field of Classification Search ............... 718/1, 108
See application file for complete search history.

(56) References Cited

U.S. PATENT DOCUMENTS

| | | | | |
|---|---|---|---|---|
| 7,765,543 | B1 * | 7/2010 | Weissman et al. ................ | 718/1 |
| 2002/0099753 | A1 * | 7/2002 | Hardin et al. ................ | 709/1 |
| 2003/0037089 | A1 * | 2/2003 | Cota-Robles et al. ............ | 709/1 |
| 2004/0123288 | A1 * | 6/2004 | Bennett et al. .................... | 718/1 |
| 2004/0268347 | A1 * | 12/2004 | Knauerhase et al. ............. | 718/1 |
| 2005/0071840 | A1 * | 3/2005 | Neiger et al. ..................... | 718/1 |
| 2007/0300218 | A1 * | 12/2007 | Mann ................................ | 718/1 |

OTHER PUBLICATIONS

Office Action received for Chinese Patent Application No. 200710305950.5, Mailed on Jun. 19, 2009, 8 pages including English translation.
Office Action received for Chinese Patent Application No. 200710305950.5, Mailed on Feb. 5, 2010, 10 pages including English translation.
Office Action received for European Patent Application No. 07254788.8, Mailed on Apr. 17, 2009, 4 pages.
Armstrong et al., "Dynamic Task Migration From SPMD to SIMD Virtual Machines", Proceedings of the International Conference on Parallel Processing (ICPP'94), IEEE, 1994, pp. 160-169.
European Search Report Received in Application No. EP 07254788.8, mailed on Oct. 15, 2008, 8 pages.
Stephen Childs et al. "GridBuilder: A Tool for Creating Virtual Grid Testbeds," E-Science and Grid Computing, Dec. 1, 2006, pp. 77-84.
Gordon et al. "V for Virtual," Electronic Notes in Theoretical Computer Science, Elsevier, vol. 162, Sep. 29, 2006, pp. 177-181.
Kozuch M. et al. "Internet Suspend/Resume," Mobile Computing Systems and Applications, Jun. 20-21, 2002, pp. 40-46. Retrieved from the Internet: http://www.escience-meeting.org, Retrieved on Oct. 14, 2008.
"2nd IEEE International Conference on e-Science and Grid Computing," E-Science, Dec. 4, 2006, 1 page.

* cited by examiner

*Primary Examiner* — Meng An
*Assistant Examiner* — Brian Chew
(74) *Attorney, Agent, or Firm* — Thomas R. Lane

(57) ABSTRACT

Embodiments of apparatuses, methods, and systems for controlling virtual machines based on activity state are disclosed. In one embodiment, an apparatus includes virtual machine entry logic and activity state evaluation logic. The virtual machine entry logic is to transfer control of the apparatus from a host to a guest. The activity state evaluation logic is to determine whether the activity state of the guest would be inactive upon receiving control.

18 Claims, 4 Drawing Sheets

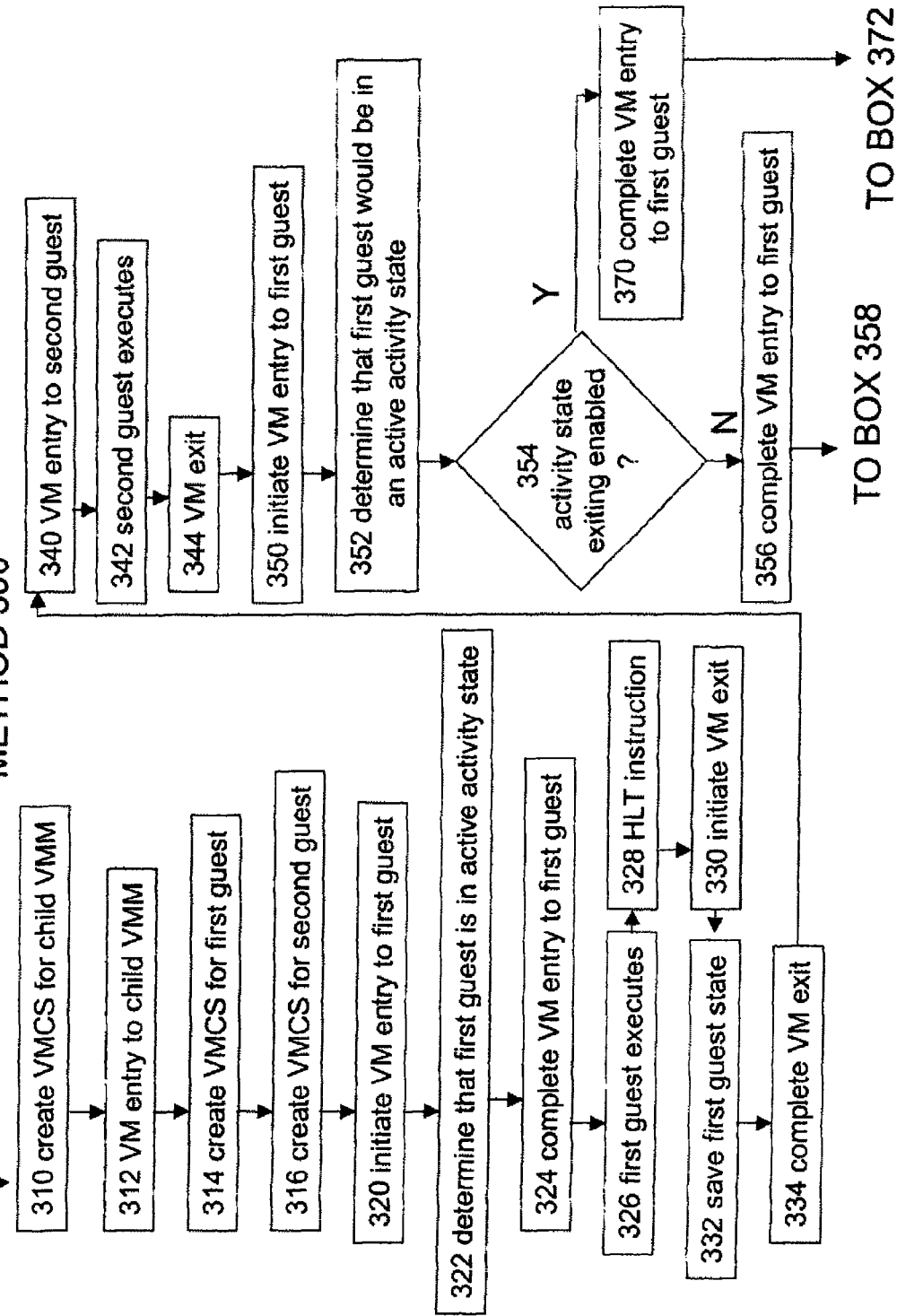

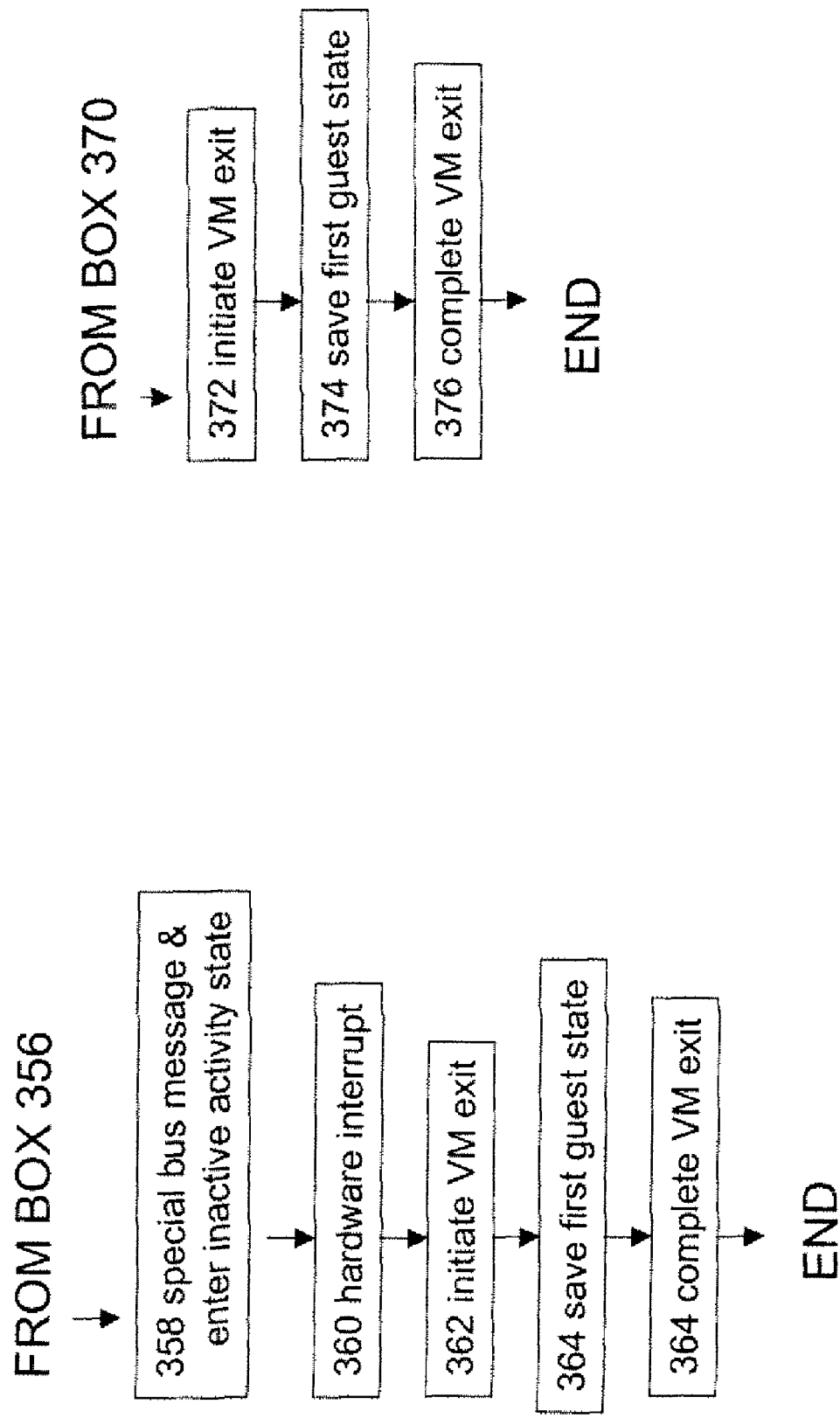

CONTROLLING VIRTUAL MACHINES BASED ON ACTIVITY STATE

BACKGROUND

1. Field

The present disclosure pertains to the field of information processing, and more particularly, to the field of virtualization.

2. Description of Related Art

Generally, the concept of virtualization in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of the virtualization environment.

A processor in an information processing apparatus may support virtualization, for example, by operating in two modes—a "root" mode in which software runs directly on the hardware, outside of any virtualization environment, and a "non-root" mode in which software runs at its intended privilege level, but within a virtualization environment hosted by a VMM running in root mode. In the virtualization environment, certain events, operations, and situations, such as external interrupts or attempts to access privileged registers or resources, may be intercepted, i.e., cause the processor to exit the virtualization environment so that a VMM may operate, for example, to implement virtualization policies. The processor may support instructions for establishing, entering, exiting, and maintaining a virtualization environment, and may include register bits or other structures that indicate or control virtualization capabilities of the processor.

A physical processor supporting a virtualization environment may also support an activity state feature for power management or another purpose. An activity state feature may provide for the processor to transition between various activity states, such as an active state, a wait state, and a halt state. These states may be classified as active or inactive, where an active state may be one in which the processor is executing instructions, and an inactive state may be one in which the processor is not executing instructions. The processor may transition between activity states based on the execution of special instructions or the detection of special bus messages or other communications. A processor may issue special messages or other communications to inform other processors, chipsets, or other components that it is transitioning between activity states.

The execution by a guest of an instruction that would, outside of a virtualization environment, cause a processor to enter an inactive state may be intercepted so that the VMM may keep the processor in an active state for itself and other guests.

BRIEF DESCRIPTION OF THE FIGURES

The present invention is illustrated by way of example and not limitation in the accompanying figures.

FIG. 3 illustrates an embodiment of the present invention in a method for controlling virtual machines based on activity states.

DETAILED DESCRIPTION

The present invention may be embodied in an apparatus, a method, or a system for controlling virtual machines based on activity states, as described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Embodiments of the present invention provide for activity state information to be used in the management of virtualization environments. According to one embodiment of the invention, if a VM entry results in a transfer of control to a guest that would cause the processor to enter an inactive activity state, a VM exit may immediately be performed so that the processor does not enter the inactive activity state. Virtual machine management based on activity state information may be desirable to provide more robust and responsive systems. For example, in a layered virtualization architecture, in which a VMM may host another VMM as a guest, which may in turn host another VMM as a guest, and so on, embodiments of the present invention may provide for an underlying VMM to efficiently monitor multiple virtualization environments having an uneven distribution of activity.

Elements of embodiments of the invention may be implemented in hardware, software, firmware, or any combination of hardware, software, or firmware. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, an expression, etc. The term firmware generally refers to a logical structure, a method, a procedure, a program, a routine, a process, an algorithm, a formula, or an expression that is implemented or embodied in a hardware structure (e.g., flash memory or read only memory). Examples of firmware are writable control store, and micro-programmed structure.

Figure 1:
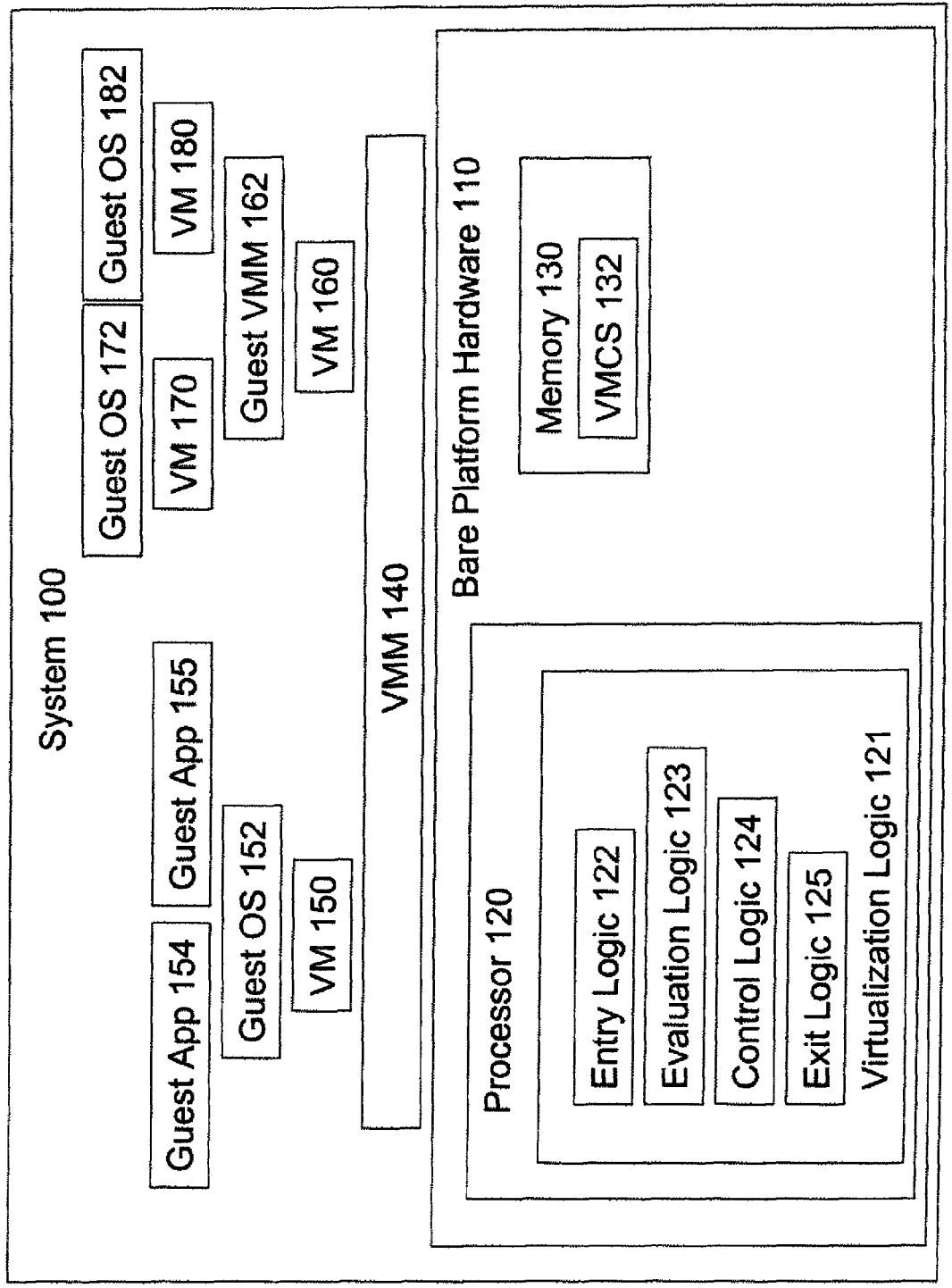
FIG. 1 illustrates an embodiment of the present invention in an information processing system.

FIG. 1 illustrates an embodiment of the present invention in information processing system 100. In FIG. 1, bare platform hardware 110 may be any data processing apparatus capable of executing any OS, VMM, or other such software. For example, bare platform hardware may be that of a personal computer, mainframe computer, portable computer, handheld device, set-top box, server, or any other computing system. Bare platform hardware 110 includes processor 120 and memory 130.

Processor 120 may be any type of processor, including a general purpose microprocessor, such as a processor in the Intel® Pentium® Processor Family, Itanium® Processor Family, or other processor family from Intel® Corporation, or another processor from another company, or a digital signal processor or microcontroller. Although FIG. 1 shows only one such processor 120, bare platform hardware 110 may include any number of processors, including any number of multicore processors, each with any number of execution cores, and any number of multithreaded processors, each with any number of threads.

Memory 130 may be static or dynamic random access memory, semiconductor-based read-only or flash memory, magnetic or optical disk memory, any other type of medium readable by processor 120, or any combination of such mediums. Processor 120 and memory 130 may be coupled to or communicate with each other according to any known approach, such as directly or indirectly through one or more buses, point-to-point, or other wired or wireless connections. Bare platform hardware 110 may also include any number of additional devices or connections.

In addition to bare platform hardware 100, FIG. 1 illustrates VMM 140, VMs 150, 160, 170, and 180, and a number of guests.

VMM 140 may be any software, firmware, or hardware host installed to run on, or accessible to, bare platform hardware 110, to present VMs, i.e., abstractions of bare platform hardware 110, to guests, or to otherwise create VMs, manage VMs, and implement virtualization policies within a virtualization environment supported by virtualization architecture 100. In this embodiment, VMM 140 is a "root mode host" because it runs in root mode on processor 120. In other embodiments, a root mode host may be any monitor, hypervisor, OS, or other software, firmware, or hardware capable of controlling bare platform hardware 110.

A guest may be any OS, any VMM, including another instance of VMM 140, any hypervisor, or any application or other software. Each guest expects to access physical resources, such as processor and platform registers, memory, and I/O devices, of bare platform hardware 110, according to the architecture of the processor and the platform presented in the VM. FIG. 1 shows VMs 150, 160, 170, and 180, with guest OS 152 and guest applications 154 and 155 installed to run on VM 150, guest VMM 162 installed to run on VM 160, guest OS 172 installed to run on VM 170, and guest OS 182 installed to run on VM 180. In this embodiment, all guests run in non-root mode. Although FIG. 1 shows four VMs, four guest OSs and two guest applications, any number of VMs may be created and any number of guest OSs and applications may be installed within the scope of the present invention.

The virtualization architecture of system 100 is "layered" or "recursive" because it allows one VMM, for example, VMM 140, to host another VMM, for example, VMM 162, as a guest. In this layered virtualization architecture, VMM 140 is the host of the virtualization environment including VMs 150 and 160, and is not a guest in any virtualization environment because it is installed to run on bare platform hardware 110 with no "intervening" monitor between it and bare platform hardware 110. An "intervening" monitor is a monitor, such as VMM 162, that hosts a guest, such as guest OS 172, but is also a guest itself. VMM 162 is the host of the virtualization environment including VMs 170 and 180, but is also a guest in the virtualization environment hosted by VMM 140. An intervening monitor (e.g., VMM 162) is referred to herein as a parent guest, because it may function as both a parent to another VM (or hierarchy of VMs) and as a guest of an underlying VMM (e.g., VMM 140 is a parent of VMM 162 which is a parent to guests 172 and 182).

A monitor, such as VMM 140, is referred to as the "parent" of a guest, such as OS 152, guest application 154, guest application 155, and guest VMM 162, if there are no intervening monitors between it and the guest. The guest is referred to as the "child" of that monitor. A guest may be both a child and a parent. For example, guest VMM 162 is a child of VMM 140 and the parent of guest OS 172 and guest OS 182.

A resource that can be accessed by a guest may either be classified as a "privileged" or a "non-privileged" resource. For a privileged resource, a host (e.g., VMM 140) facilitates the functionality desired by the guest while retaining ultimate control over the resource. Non-privileged resources do not need to be controlled by the host and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "events" herein. Some of these events are "privileged" because they must be handled by a host to ensure proper operation of VMs, protection of the host from guests, and protection of guests from each other.

At any given time, processor 120 may be executing instructions from VMM 140 or any guest, thus VMM 140 or the guest may be active and running on, or in control of, processor 120. When a privileged event occurs or a guest attempts to access a privileged resource, control maybe transferred from the guest to VMM 140. The transfer of control from a guest to a host is referred to as a "VM exit" herein. After handling the event or facilitating the access to the resource appropriately, VMM 140 may return control to a guest. The transfer of control from a host to a guest is referred to as a "VM entry" herein.

In addition to a VM exit transferring control from a guest to a root mode host, as described above, embodiments of the present invention also provide for a VM exit to transfer control from a guest to a non-root mode host, such as an intervening monitor.

In the embodiment of FIG. 1, processor 120 controls the operation of VMs according to data stored in virtual machine control structure ("VMCS") 132. VMCS 132 is a structure that may contain state of a guest or guests, state of VMM 140, execution control information indicating how VMM 140 is to control operation of a guest or guests, information regarding VM exits and VM entries, any other such information Processor 120 reads information from VMCS 132 to determine the execution environment of a VM and constrain its behavior. In this embodiment, VMCS 132 is stored in memory 130. VMCS 132 may be divided into multiple structures, each corresponding to one host or one guest, where each may be considered an independent VMCS.

The "guest hierarchy" of a VMM is the stack of software installed to run within the virtualization environment or environments supported by the VMM. The present invention may be embodied in a virtualization architecture in which guest hierarchies include chains of pointers between VMCSs. These pointers are referred to as "parent pointers" when pointing from the VMCMS of a child to the VMCS of a parent, and as "child pointers" when pointing from the VMCS of a parent to the VMCS of a child.

Figure 2:
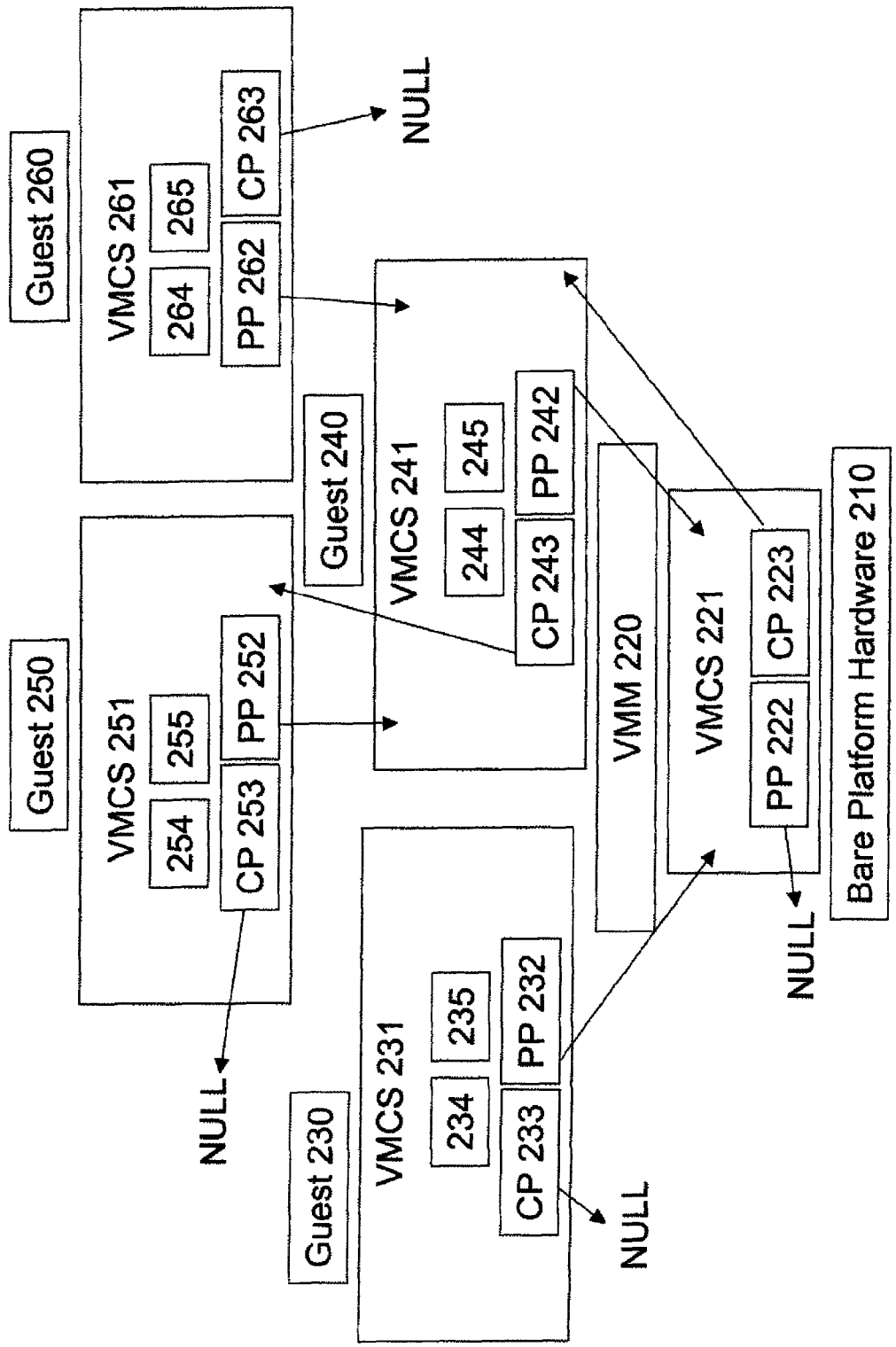
FIG. 2 illustrates the guest hierarchy of a VMM in a layered virtualization architecture.

FIG. 2 illustrates the guest hierarchy of VMM 220, which is installed as a root mode host on bare platform hardware 210. VMCS 221 is a control structure for VMM 220, although a root mode host may operate without a control structure. Guest 230 is a child of VMM 220, controlled by VMCS 231. Therefore, parent pointer ("PP") 232 points to VMCS 221. Guest 240 is also a child of VMM 220, controlled by VMCS 241. Therefore, parent pointer 242 also points to VMCS 221, Guest 240 is itself a VMM, with two children, guests 250 and 260, each with a VMCS, 251 and 261, respectively. Both parent pointer 252 and parent pointer 262 point to VMCS 241.

The VMCS of a guest that is active, or running, is pointed to by the child pointer of its parent's VMCS. Therefore, FIG. 2 shows child pointer 243 pointing to VMCS 251 to indicate that guest 250 is active. Similarly, the VMCS of a guest with an active child pointer, as opposed to a null child pointer, is pointed to by the child pointer of its parent's VMCS. Therefore, FIG. 2 shows child pointer 223 pointing to VMCS 241. Consequently, a chain of parent pointers links the VMCS of an active guest through the VMCSs of any intervening monitors to the VMCS of a root mode host, and a chain of child pointers links the VMCS of a root mode host through the VMCSs of any intervening monitors to the VMCS of an active guest.

The VMCS 221 is referred to herein as the "root VMCS". In an embodiment, there is no root VMCS, as described above. In an embodiment which includes a root VMCS, the processing hardware may maintain a pointer to the root VMCS in an internal register or other data structure. The VMCS of a guest that is active, as described above, is referred to herein as the current controlling VMCS. For example, while guest 250 is active, VMCS 251 is the current controlling VMCS. In an embodiment, the processing hardware may maintain a pointer to the current controlling VMCS in an internal register or other data structure.

If a VMCS is not a parent VMCS, its child pointer, such as child pointers 233, 253, and 263, may be a null pointer. If a VMCS does not have a parent, for example, if it is a root-mode VMCS, its parent pointer, such as parent pointer 222, may be a null pointer. Alternatively, these pointers may be omitted. In some embodiments, the "null" value for a null VMCS pointer may be zero. In other embodiments, other values may be interpreted as "null". For example, in one embodiment with 32-bit addresses, the value 0xffffffff may be interpreted as null.

Each guest's VMCS in FIG. 2 includes a number of bits for information related to activity state based VM control according to embodiments of the present invention, although fields or any other information storage space or format may be used instead of bits. For example, activity state handling indicators 234, 244, 254, and 264 are bits to control and indicate whether a VM exit is to be performed if the corresponding guest is in an inactive activity state upon a VM entry, as described below. These bits may be set by software (e.g., the corresponding host VMM) to enable this feature, and read by virtualization control logic 121 (as described below) to determine whether the actions defined for this feature are performed. Also, activity state status indicators 235, 245, 255, and 265 are bits to control and indicate the activity state of corresponding guest, as described below. These bits may be set by software (e.g. the corresponding host VMM) to control the activity state of the corresponding guest, set by virtualization control logic 121 to indicate the activity state of the corresponding guest, and read by software or virtualization control logic 121 to determine the activity state of a corresponding guest.

Returning to FIG. 1, processor 120 includes virtualization logic 121 to support virtualization, including activity state handling in a layered virtualization architecture. Virtualization logic 121 may be implemented in microcode, programmable logic, hard-coded logic, or any other form of control logic within processor 120. In other embodiments, virtualization logic 121 may be implemented in any form of hardware, software, or firmware, such as a processor abstraction layer, within a processor or within any device accessible or medium readable by a processor, such as memory 130.

Virtualization logic 121 includes VM entry logic 122, activity state evaluation logic 123, VM control logic 124, and VM exit logic 125. VM entry logic 122 is to prepare for and cause a VM entry. Activity state evaluation logic 123 is to determine whether the guest receiving control in a VM entry would be in an inactive activity state upon receiving control. VM control logic 124 is to determine if activity state handling, as described below, is enabled. VM exit logic 125 is to prepare for and cause a VM exit. Each of these logic units may also perform additional functions, including those described as being performed by another of the logic units, and any or all of these logic units may be integrated into a single logic unit.

Control logic 121 causes processor 120 to execute method embodiments of the present invention, such as the method embodiment illustrated in FIG. 3, for example, by causing processor 120 to include the execution of one or more microoperations, e.g., to support virtualization, in its response to virtualization instructions, other instructions from a host or guest, or virtualization events.

FIG. 3 illustrates method 300 for controlling virtual machines according to an embodiment of the present invention. Although method embodiments are not limited in this respect, reference is made to FIGS. 1 and 2 to describe the method embodiment of FIG. 3.

In box 310, a parent VMM (e.g., VMM 220) creates and configures a VMCS (e.g., VMCS 241) for a child VMM (e.g., guest VMM 240), including programming an activity state handling indicator (e.g., field 244). In box 312, a VM entry is performed from the parent VMM to the child VMM. In box 314, the child VMM creates and configures a VMCS (e.g., VMCS 251) for a first guest (e.g. guest 250), including programming an activity state status indicator (e.g. field 255). In this case, field 255 is set to indicate that the guest 250 is in an active activity state, In box 316 the child VMM creates and configures a VMCS (e.g. VMCS 261) for a second guest (e.g. guest 260).

In box 320, a VM entry is initiated from the child VMM to the first guest. In box 322, evaluation logic 322 determines that the first guest would be in an active activity state upon the VM entry, e.g., by reading activity state status indicator 255. Therefore, in box 324, the VM entry is completed with no immediate VM exit. In box 326, the first guest begins or continues to execute instructions. In box 328, the first guest attempts to execute an instruction that would cause the processor to enter an inactive activity state (e.g. a halt or other similar instruction).

In box 330, the halt instruction is intercepted, causing a VM exit to the child VMM to be initiated. In box 332, the state of the first guest is saved to its VMCS, including modifying the activity state status field to indicate that the activity state of the first guest would be inactive upon a VM entry to it. In another embodiment, the activity state status field may be unmodified during the VM exit. In box 334, the VM exit is completed.

In box 340, a VM entry to a second guest (e.g., guest 260) is performed. In box 342, the second guest begins or continues to execute instructions. In box 344, a virtualization event occurs and a VM exit is performed to transfer control back to the child VMM.

In box 350, a VM entry to the first guest is initiated. In box 352, evaluation logic 322 determines that the first guest would be in an inactive activity state upon the VM entry, e.g., by reading activity state status indicator 255. Therefore, in box 354, VM control logic determines whether the VM entry is to be followed by an immediate VM exit to prevent the processor from entering an inactive activity state. This determination may be made by reading an activity state handling indicator (e.g., field 244) in the VMCS for the host that initiated the VM entry. This determination may be made according to a top-down approach, so if the activity state handling indicator for the initiating host is not set to indicate that a VM exit is to be performed, the activity state handling indicator for the parent of the initiating host is read, and so on, down to the root VMCS.

If it is determined that no immediate VM exit is to occur, then the VM entry is completed in box 356, and method 300 continues in box 358. Otherwise, method 300 continues from box 354 to box 370.

In box 358, the processor issues a special bus message or other communication to indicate that it is entering an inactive activity state, and enters an inactive activity state. In box 360, a hardware interrupt or other break event occurs, causing the processor to transition to an active activity state. In this embodiment, the hardware interrupt also causes a VM exit, which is initiated in box 362. In box 364, the state of the first guest is saved to its VMCS, including setting the activity state status field to indicate that the activity state of the first guest would be active upon a VM entry to it. In another embodiment, the activity state status field may be unmodified during the VM exit. In box 366, the VM exit is completed, and method 300 ends.

In box 370, the VM entry is completed, followed by an immediate VM exit, initiated in box 372, preventing the processor from entering an inactive activity state and issuing any type of special bus message or other communication to indicate that it is entering an inactive activity state. In box 374, the state of the first guest is saved to its VMCS, including setting the activity state status field to indicate that the activity state of the first guest would be inactive upon a VM entry to it. In another embodiment, the saved activity state status field indicates an active state. In box 376, the VMM exit is completed, with a transfer of control to the parent of the host for which the activity state handling indicator is found to be set. In this case, activity state handling indicator 244 is set, so no top-down recursive determination is performed, and the VM exit is performed to parent VMM 220, and method 300 ends.

Within the scope of the present inventions it may be possible for the method illustrated in FIG. 3 to be performed in a different order, performed with illustrated boxes omitted, performed with additional boxes added, or performed with a combination of reordered, omitted, or additional boxes.

In some embodiments of the present invention, a VMM may be able to vector or inject events into a guest by programming certain information into the VMCS for the guest, then performing a VM entry to transfer control to the guest. In these embodiments, a guest may be in an inactive activity state before the VM entry, but virtualization control logic 121 may be designed such that an immediate VM exit is not performed because the guest is placed in an active activity state to handle to event.

In some embodiments of the present inventions, a guest may be in an inactive activity state, but may transition to an active activity state if and when a pending break event occurs. In these embodiments, if a VM entry occurs to this guest while it is still in an inactive state, virtualization control logic 121 may be designed such that an immediate VM exit is performed because the pending break event is not recognized prior to the evaluation for activity state based VM control. In another embodiment, the break event may be recognized before the evaluation of the activity state exiting.

Processor 120, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, systems, apparatuses, and methods for controlling virtual machines based on activity states have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   processor hardware;
   virtual machine entry logic to transfer control of the processor hardware from a host to a guest;
   activity state evaluation logic to determine that activity state of the guest would be inactive upon receiving control; and
   virtual machine exit logic to, in response to the determination and upon the guest receiving control, prevent the processor from entering an inactive state by transferring control of the processor hardware from the guest to a parent.

2. The apparatus of claim 1, further comprising virtual machine control logic to determine whether to transfer control from the guest in response to the activity state evaluation logic determining that the activity state of the guest would be inactive upon receiving control.

3. The apparatus of claim 2, further comprising virtual machine exit logic to transfer control from the guest in response to the activity state evaluation logic determining that the activity state of the guest would be inactive upon receiving control and the virtual machine control logic determining to transfer control from the guest.

4. The apparatus of claim 2, wherein the virtual machine control logic is to determine whether to transfer control from the guest based on an activity state handling indicator in a virtual machine control structure.

5. The apparatus of claim 2, wherein the virtual machine control logic is to determine whether to transfer control from the guest to a parent of the host based on an activity state handling indicator in a virtual machine control structure for the host.

6. The apparatus of claim 5, further comprising virtual machine exit logic to transfer control from the guest to the parent of the host.

7. The apparatus of claim 5, wherein there are no intervening monitors between the host and the parent of the host.

8. The apparatus of claim 5, wherein the virtual machine control logic is also to determine whether to transfer control from the guest to the parent of the host based on an activity state handling indicator in a virtual machine control structure for the parent of the host.

9. The apparatus of claim 8, further comprising virtual machine exit logic to transfer control from the guest to a parent of the parent of the host.

10. A method comprising:
   initiating a transfer of control of a processor from a host to a guest;
   determining that activity state of the guest will be inactive upon receiving control; and
   in response to the determination and upon the guest receiving control, preventing the processor from entering an inactive activity state by transferring control from the guest to a parent.

11. The method of claim 10, further comprising completing the transfer of control from the host to the guest after determining that the activity state of the guest will be inactive and before transferring control from the guest.

12. The method of claim 10, further comprising determining whether to transfer control from the guest based on an activity state handling indicator in a virtual machine control structure.

13. The method of claim 10, wherein transferring control from the guest includes transferring control to a first parent of the host.

14. The method of claim 10, further comprising:
   determining not to transfer control from the guest to a first parent of the host based on an activity state handling indicator in a virtual machine control structure for the host; and
   determining to transfer control from the guest to a second parent of the host based on an activity state handling indicator in a virtual machine control structure for the first parent of the host.

15. The method of claim 10, further comprising:
   vectoring an event to the guest; and
   changing the activity state of the guest from inactive to active to handle the event upon receiving control.

16. The method of claim 10, wherein the guest is in an inactive state pending a break event, the method further comprising:
   completing the transfer of control from the host to the guest; and
   transferring control from the guest upon the guest receiving control.

17. A system comprising:
   a processor including:
      virtual machine entry logic to transfer control of the processor from a host to a guest,
      activity state evaluation logic to determine that activity state of the guest would be inactive upon receiving control, and
      virtual machine exit logic, in response to the determination and upon the guest receiving control, prevent the processor from entering an inactive activity state by transferring control of the processor hardware from the guest to a parent; and
   a memory to store a data structure to store an indicator used by the activity state evaluation logic.

18. The system of claim 17, wherein the memory is dynamic random access memory.

\* \* \* \* \*